(No Model.)
W. M. SCHLESINGER.
ELECTRIC RAILWAY.
No. 553,264. Patented Jan. 21, 1896.
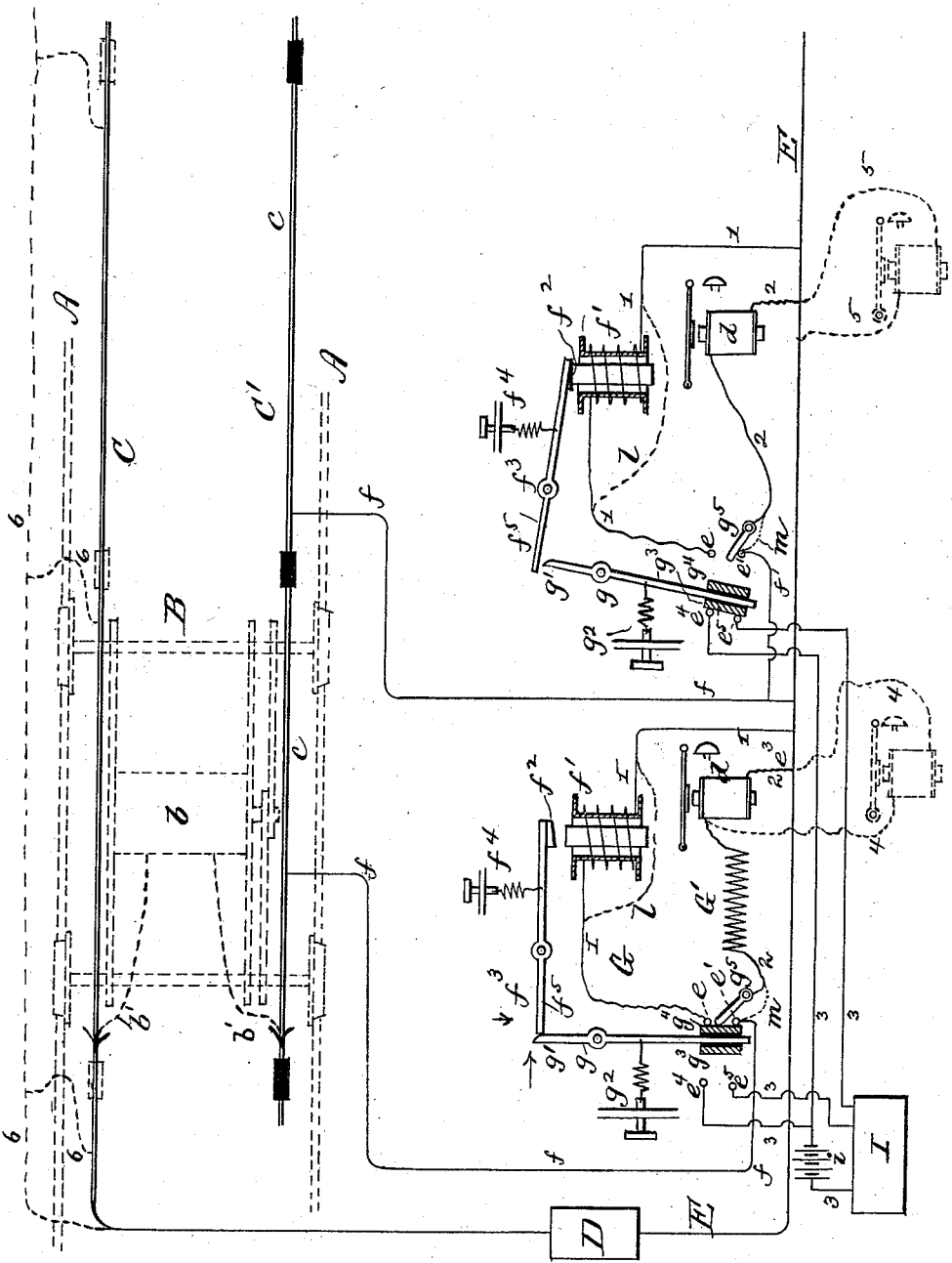
WITNESSES:
Charles W. Rufe
Wm. F. Van Horn
INVENTOR,
Wm. M. Schlesinger
By S. J. Van Stavoren
ATTORNEY

UNITED STATES PATENT OFFICE.

WILLIAM M. SCHLESINGER, OF PHILADELPHIA, PENNSYLVANIA, ASSIGNOR, BY MESNE ASSIGNMENTS, TO A. H. WILLIAMS, OF SAME PLACE.

ELECTRIC RAILWAY.

SPECIFICATION forming part of Letters Patent No. 553,264, dated January 21, 1896.

Application filed December 21, 1886. Serial No. 222,177. (No model.)

*To all whom it may concern:*

Be it known that I, WILLIAM M. SCHLESINGER, a subject of the Queen of Great Britain, residing at Philadelphia, in the county of Philadelphia and State of Pennsylvania, have invented certain new and useful Improvements in Electric Railways, of which the following is a specification.

My invention has relation to line circuits or conductors for electric railways or for other purposes, and has particular reference to that form of same wherein a line of working conductors having feeding-conductors are used, one or both working conductors being divided into sections, each of which is separate or insulated from the others and provided with a current safety device and an indicator at a main or other station, so that when the electrical condition of any one or more of the sections becomes leaky, faulty, or defective, thereby causing an excess of current to pass to the faulty section, its safety device acts to cut it out of the line-circuit and operate the indicator at the main or distant station to inform the attendants thereat of the presence of a faulty section in the working conductors, this being done without affecting the circuit connections of the remaining sections, or that of the line as a whole, the operativeness of which remains intact and the safety and continuity of travel or traffic thereon undisturbed. In this described form of line circuit or conductors as heretofore constructed or arranged the static discharge incident to the action of the safety device opening the circuit of a section to cut it out of its feeding conductor is liable to produce a too sudden interruption of the current given by the dynamo at the generating-station, and this interruption is apt to burn out or endanger the safety of the insulation of the coils of the dynamo, and, further, although the leaky or faulty section cut out is indicated at the main or generating station yet there is nothing at the safety device or its station to indicate whether the fault or leak is permanent and the section or conductors need repairing, or whether the leak or fault is only temporary, due to the passage of a train or other like cause, which temporary fault rectifies itself when the train passes the section or the cause is removed, in which case the sections or conductors need no repairs.

My invention has for its object to prevent the static discharge incident to the action of a safety device in cutting out a faulty or leaky section, producing a too sudden interruption in the current given by the generator and thus to avoid the danger of burning out the insulation of its coils when a section is cut out of the working conductors, and, further, to provide each safety device with an indicator or indicators for denoting whether the fault or leak in the cut-out section or sections is permanent or temporary. If permanent the lineman looks up the cause of the leak and makes the repairs at once. If merely temporary, and it subsequently corrects itself, the lineman need only readjust the safety device to place the cut-out section into the circuit of its feeding-conductor. These indicators are preferably located at the safety-device stations and they are used in addition to the indicator at the central or generating station.

The two indicators—that is, the main station and safety-device station indicators—are relatively arranged in respect to one another, so that when a leak or fault in a section occurs and its safety device acts to cut out the section both indicators for said section are simultaneously operated. The one at the central station continues to operate or show faulty section as long as the section remains cut out of the working conductor, while the indicator at the safety-device station operates or shows only so long as the fault or leak in the section continues. If, therefore, the fault is temporary only—that is, is a fault produced by a passing train or other cause—and subsequently corrects itself after the train passes or the cause is removed, the indicator at the safety-device station then ceases to operate or show, and thereby denotes that the leak or fault no longer exists. A lineman, therefore, arriving at the safety-device station indicated by the box or signal at the central station and finding that the indicator at the same is not operating or showing to denote a leak is aware that the leak has corrected itself and that no search need be made to find the leak indicated by the box at the central station. The lineman, therefore, then merely adjusts the safety device to place the cut-out section into the circuit of the working conductors. If upon arrival at the safety-device station the lineman finds the indicator thereat operating or showing a signal he is then aware that the fault or leak is permanent or still exists, and must search for and repair the same before the indicator at the safety-device station ceases to operate or show, and when this occurs it indicates to him that the necessary repairs have been made.

My invention accordingly consists of a line of working conductors one or both of which have insulated or separate sections and a generator and feeding-conductors therefor, and each section having between it and its feeding-conductors two paths or circuits, one of low and the other of high resistance. The low-resistance path, including a safety device, through which the normal current for the section passes, the safety device acting by excess of current passing through it, due to a leak in the section, to simultaneously cut the section out of the working conductors, operates an indicator or signal at the generating-station to denote that the section is cut out and shift or shunt the current to the path or current of high resistance, the latter including a bell or indicator for denoting the continuance of a leak or fault in the section cut out, said resistance-circuit also preventing the static discharge incident to the action of the safety device, causing a too sudden interruption of the current given by the dynamo at the central station to avoid endangering the insulation of its coils. As the sections of the working conductors may be variously divided and arranged and as one, two, or more feeding-conductors may be used, their number depending upon the division and arrangement of the working-conductor sections, I do not limit my invention to any one form of the same or circuit connections therefor, and as numerous forms of safety devices and of signally mechanism may be also used I wish it to be understood that I do not confine myself to any particular form of same, nor to circuit connections therefor.

In the drawing, which is a sectional diagram illustrating my invention, A represents a line of railway-track, B a car or car-truck provided with a suitable electric motor $b$ and traveling current-collectors $b'$, which take current from the working conductors C C'. These current-collectors may be of any desired construction, as they specifically form no part of my invention. The conductors C C' have a generator or generators D, and one of the conductors C is preferably continuous and leads directly to one pole or commutator-brush of the generator D, as indicated in full lines of the drawing, while the other conductor C' is composed of sections or divisions $c$ insulated or separate from one another and are in multiple-arc relation to a feeding-conductor E, which leads to the opposite pole or remaining brush of the generator. Each section $c$ between it and the feeding-conductor E has two paths or circuits $1\,1\,f$ and $2\,2\,f$, the former being a path of low and the latter a path of high resistance. The path $1\,1\,f$ is provided with a safety device G for preventing excess of current passing to the section when its electrical condition is faulty. These safety devices may be of any suitable construction; but I show what I deem a preferable form of same, consisting of a low-resistance magnet or solenoid $f'$, the armature $f^2$ of which is secured to a pivoted lever $f^3$, having a retracting-spring $f^4$, the force of which is greater than the attractive force of magnet $f'$ when the normal current for a section is passing through it. Consequently the magnet $f'$ does not normally attract its armature, which is then in the position shown to the left of the drawing. It is locked in this position by the end $f^5$ of lever $f^3$ impinging against the end $g'$ of another pivoted lever $g$, which has a retracting-spring $g^2$ to maintain such impingement. The respective springs of the levers $f^3$ and $g$ move them into locking engagement, and they are preferably located at right angles to one another, as shown, so as to make a frictional locking engagement which is readily unlocked. At the lower end of lever $g$ are two insulated blocks $g^3 g^4$. When lever $g$ is in its normal position plate $g^4$ closes the circuit from magnet-wire $1\,1$ through contacts or terminals $e\,e'$ to wire $f$ for the section to complete the path of low resistance $1\,1\,f$ between the section and feeding-conductor E. The branch $2\,2$ includes a magnetic bell or other signaling or indicating device $d$ and connects with the feeding-conductor E, as shown at $e^3$. The high resistance in path $2\,2$ may be separate from bell or indicator magnet $d$, as shown at G', or it may be on the bell-magnet only, as indicated to the right of the drawing. The terminal of wire $2\,2$ may be a pivoted contact-bar $g^5$, resting loosely against bridge-plate $g^4$ to complete the path of high resistance $2\,2\,f$ to the section, or said terminal may connect directly with the terminal $e'$, as indicated by dotted line $m$.

Adjacent to and in line with plate or block $g^3$ of lever $g$ are other contacts or terminals $e^4\,e^5$ for a line $3\,3$ leading to an indicator-box or other signaling device I of any suitable construction at a central, main or other station, which box has its separate battery or generator $i$, or it may be otherwise constructed, as desired. The box preferably has a signal or indicator for each section $c$, or separate boxes for separate sections may be used.

The indicator or signal $d$ in the high-resistance circuit $2\,2$ is preferably located at the point of location of the safety device for each section, but it may be placed at a local station along the line, as indicated by dotted lines 4 in the drawing, or one of said signals may be at the safety-device station and another located at a distant local station, as illustrated at 5. When the current passing to each section $c\,c$ is normal, the greater portion of it takes the path of low resistance 1 1 $f$. The magnet $f'$ included therein is not then strong enough to attract its armature, owing to the superior power of the retracting-spring $f^4$. The safety device G remains inoperative and the small amount of current passing through magnet $d$ fails to actively energize the same. When, however, an excess of current passes through magnet $f'$ due to faulty insulation or short-circuiting of a section or from other causes, its attractive force overpowers or becomes greater than that of spring $f^4$ and the lever $f^3$ is moved out of locking engagement with lever $g$, which in turn is, by its spring $g^2$, moved to bring its block or bridge plate $g^3$ into contact with the terminals $e^4$ $e^5$ and break contact between plate $g^4$ and terminals $e$ $e'$. Meanwhile the pivoted terminal $g^5$ of wire 2 2, when said terminal is used, falls down upon contact-point $e'$, as indicated to the right in the drawing, to maintain the continuity of the high-resistance circuit 2 2 $f$, and the section is practically cut out of the line. The insertion of this high resistance into the feeding-conductor E when a section is cut out prevents the static discharge incident to the action of the safety device causing a too sudden interruption in the current given by the generator, and consequently all danger of burning its insulation due to said interruption is avoided. As soon as the last-described connections are made and the section is cut out circuit is closed through the indicator or signal I at the main station and through the like devices in the resistance-circuit 2 2, and these signaling devices electrically operate to notify the attendants at both stations of the presence of a bad or faulty section on the line and whereat it is located. A lineman is then sent to the safety-device station indicated as being cut out, and upon arrival there, if he finds the signal or indicator $d$ still operating or showing, he is aware that the cause of the leak still exists and must be found and repaired, and the repairs made must be such that they correct the cause, or the signal $d$ continues to operate or show. Hence this indicator not only shows that the fault exists, but also notifies the lineman whether or not the repairs made remove the cause. When the indicator $d$ shows this, by ceasing to operate or display the signal, the lineman then manually adjusts levers $f^3$ $g$ to place the section in circuit with its feeding-conductor E. If upon arrival at said safety-device station the lineman finds the signal or indicator $d$ not operating or showing, he knows that the cause of the fault or leak no longer exists and that no repairs are needed. He then merely adjusts levers $f^3$ and $g$ to switch the section into the circuit of the feeding-conductor.

If desired, a bridge or shunt wire 1 may be provided for magnet $f'$ to prevent the total normal current and also the total excess of current passing through the magnet, to avoid any liability of destroying or impairing the same by too intense currents passing through it.

If desired, the working conductor C may be divided into sections and be in multiple-arc relation with a feeding-conductor, as indicated by dotted lines 6.

What I claim is—

1. In an electric railway the combination of a working conductor comprising a series of insulated or disconnected sections, a series of separate feeding conductors for supplying said sections, conductors constituting paths of high and low resistance interposed in said feeding conductors, safety devices in the conductors of low resistance, and return circuit connections opposed to said sections, substantially as described.

2. In an electric railway the combination of a working conductor, return circuit connections opposed to said working conductor, a feeding conductor provided with paths or loops of high and low resistance, a safety device for the path of low resistance, and a signaling or indicating device for the path of high resistance, substantially as described.

In testimony whereof I affix my signature in presence of two witnesses.

WILLIAM M. SCHLESINGER.

Witnesses:
S. J. VAN STAVOREN,
CHAS. F. VAN HORN.